United States Patent
Sawarkar et al.

(10) Patent No.: US 11,107,040 B2
(45) Date of Patent: Aug. 31, 2021

(54) JOB DESCRIPTION GENERATOR

(71) Applicant: ADP, LLC, Roseland, NJ (US)

(72) Inventors: Kunal Sawarkar, Franklin Park, NJ (US); Leonard Kim, South Pasadena, CA (US)

(73) Assignee: ADP, INC, Roseland, NJ (US)

( * ) Notice: Subject to any disclaimer, the term of this patent is extended or adjusted under 35 U.S.C. 154(b) by 326 days.

(21) Appl. No.: 16/006,941

(22) Filed: Jun. 13, 2018

(65) Prior Publication Data

US 2019/0385123 A1   Dec. 19, 2019

(51) Int. Cl.
*G06Q 10/10* (2012.01)
*G06N 3/06* (2006.01)

(52) U.S. Cl.
CPC .......... *G06Q 10/1053* (2013.01); *G06N 3/06* (2013.01)

(58) Field of Classification Search
CPC ..... G06Q 10/1053; G06N 3/08; G06N 3/0445
USPC .......................................................... 705/321
See application file for complete search history.

(56) References Cited

U.S. PATENT DOCUMENTS

| | | | | |
|---|---|---|---|---|
| 2005/0021383 A1* | 1/2005 | Fliess, V | ............... | G06Q 10/04 705/7.14 |
| 2015/0317754 A1* | 11/2015 | Goel | ...................... | H04L 67/30 705/319 |
| 2015/0347975 A1* | 12/2015 | Kelly | ................ | G06Q 10/1053 705/321 |
| 2016/0350672 A1* | 12/2016 | Snyder | ................... | G06N 20/00 |
| 2017/0270485 A1* | 9/2017 | Meier | .............. | G06Q 10/06398 |
| 2017/0300563 A1* | 10/2017 | Kao | ........................ | G06F 16/337 |
| 2017/0371957 A1* | 12/2017 | Merhav | .................. | G06Q 50/01 |
| 2018/0173803 A1* | 6/2018 | Grover | .................. | G06F 16/248 |
| 2018/0181915 A1* | 6/2018 | Chen | ..................... | G06F 16/353 |
| 2019/0095868 A1* | 3/2019 | Zhang | ................ | G06Q 10/1053 |
| 2019/0138637 A1* | 5/2019 | Hogan | ............... | G06Q 10/1053 |
| 2019/0138645 A1* | 5/2019 | Zhang | .................. | G06F 16/332 |

OTHER PUBLICATIONS

Andrew Tch: "The mostly complete chart of Neural Networks, explained") https://towardsdatascience.com/the-mostly-complete-chart-of-neural-networks-explained-3fb6f2367464 (Year: 2017).*
Sutskever, Ilya, James Martens, and Geoffrey E. Hinton. "Generating text with recurrent neural networks." ICML. 2011. (Year: 2011).*
Van-Duyet, Le, Vo Minh Quan, and Dang Quang An. "Skill2vec: Machine learning approach for determining the relevant skills from job description." arXiv preprint arXiv: 1707.09751 (2017 (Year: 2017).*
Boselli, Roberto, et al. "Classifying online job advertisements through machine learning." Future Generation Computer Systems 86 (2018): 319-328. (Year: 2018).*

* cited by examiner

Primary Examiner — Richard W. Crandall
Assistant Examiner — Corey Russ
(74) Attorney, Agent, or Firm — Patrick J. Daugherty; Daugherty & Del Zoppo, Co. LPA (57) ABSTRACT

Aspects of the present invention provide devices that generate a job description by generating at least one job description according to a plurality of job areas and a linguistic model trained on a plurality of cataloged job descriptions, each job area including one or more assigned job skills, and displaying the generated at least one job description on a display device.

14 Claims, 4 Drawing Sheets

JOB DESCRIPTION GENERATOR

BACKGROUND

The field of Human Capital Management (HCM) includes recruitment and hiring of employees, particularly the generation of job descriptions of positions to be hired.

A job description is a document, which describes, in natural language, a position for hiring. The job description identifies the position by a title, and describes aspects of the position. The job description includes an explanation of a role of the position in the entity or a summary of the position, goals or duties of the position, and requirements or qualifications for the position.

A conventional approach to a generation of the job description is an iterative process of writing, reviewing, editing and approving by different departments or positions within an entity. For example, a hiring manager and a human resource practitioner iteratively develop the job description based on past job description data, similar profiles on job boards, industry mappings, and position details. Revisions can include, for example, changing keywords used in the job description, which can differ by job position and/or industry.

BRIEF SUMMARY

In one aspect of the present invention, a computer-implemented method for generating a job description includes executing on a computer processor generating at least one job description according to a plurality of job areas and a linguistic model trained on a plurality of cataloged job descriptions. Each job area includes one or more assigned job skills. The generated at least one job description is displayed on a display device.

In another aspect, a system has a hardware processor, computer readable memory in circuit communication with the processor, and a computer-readable storage medium in circuit communication with the processor and having program instructions stored thereon. The processor executes the program instructions stored on the computer-readable storage medium via the computer readable memory and thereby generating a job description, which generates at least one job description according to a plurality of job areas and a linguistic model trained on a plurality of cataloged job descriptions. Each job area includes one or more assigned job skills. The processor displays the generated at least one job description on a display device.

In another aspect, a computer program product for generating a job description has a computer-readable storage medium with computer readable program code embodied therewith. The computer readable hardware medium is not a transitory signal per se. The computer readable program code includes instructions for execution by a processor that cause the processor to generate at least one job description according to a plurality of job areas and a linguistic model trained on a plurality of cataloged job descriptions. Each job area includes one or more assigned job skills. The computer readable program code includes instructions for execution by the processor that cause the processor to display the generated at least one job description on a display device.

BRIEF DESCRIPTION OF THE DRAWINGS

These and other features of embodiments of the present invention will be more readily understood from the following detailed description of the various aspects of the invention taken in conjunction with the accompanying drawings in which.

DETAILED DESCRIPTION

The present invention may be a system, a method, a computer program product, and combinations thereof. The computer program product may include a computer readable storage medium (or media) having computer readable program instructions thereon for causing a processor to carry out aspects of the present invention.

Figure 1:
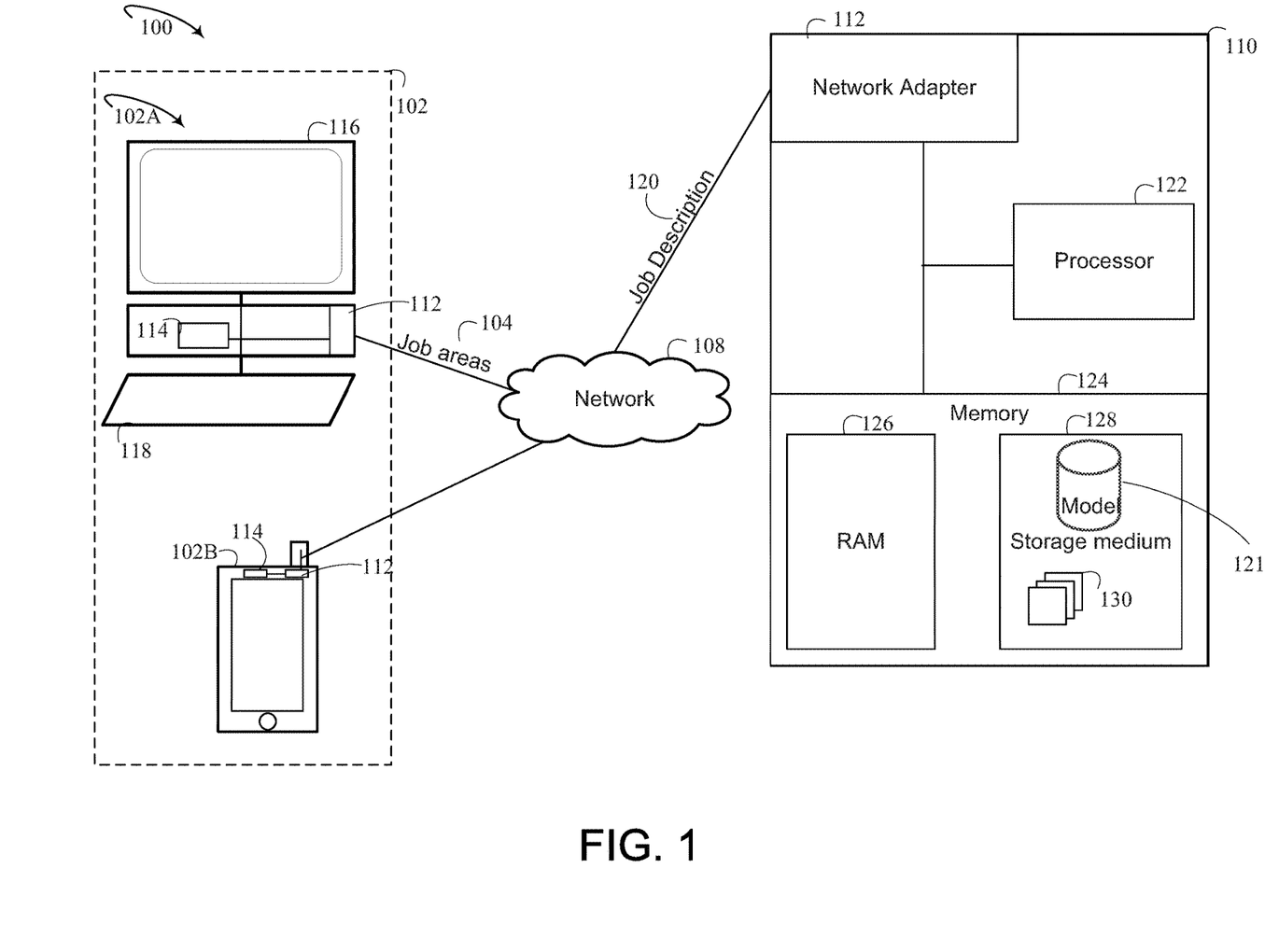
FIG. 1 depicts a schematic illustration of system aspects according to an embodiment of the present invention.

With reference to FIG. 1, a schematic of an embodiment of a system 100 for generating a job description is depicted. The system 100 includes a local computing device 102, such as, for example, a desktop computer 102A, laptop computer, personal digital assistant, tablet, smartphone 102B, cellular telephone, body worn device, and the like. The local computing device 102 transfers a set of job areas 104 over a network 108 to a computer server 110. Each job area includes one or more assigned skills. The local computing device 102 includes a network interface adapter 112, a processor 114, a display device 116, and one or more input devices 118, such as a keyboard, mouse, microphone, touch screen, and the like.

The computer server 110, in response to receiving the job areas 104, generates one or more job descriptions 120 according to a linguistic model 121 trained on cataloged job descriptions.

The computer server 110 returns the generated job description 120 to the local computing device 102. The local computing device 102 displays the job description 120 on the display device 116.

The lines of the schematic illustrate communication paths between devices and between components with each device. Communication paths between the local computing device 102 and the computer server 110 over the network 108 include a network interface device 112 in each device, such as a network adapter, network interface card, wireless network adapter, and the like.

The computer server 110 includes a processor 122 configured with instructions stored in a memory 124. The processor 122 of the computer server 110 and the processor 114 of the local computing device include, for example, a digital processor, an electrical processor, an optical processor, a microprocessor, a single core processor, a multi-core processor, distributed processors, parallel processors, clustered processors, combinations thereof and the like. The memory 124 includes a computer readable memory 126 and a computer readable storage medium 128.

The computer readable storage medium 128 can be a tangible device that retains and stores instructions for use by an instruction execution device, such as the processor 122. The computer readable storage medium 128 may be, for example, but is not limited to, an electronic storage device, a magnetic storage device, an optical storage device, an electromagnetic storage device, a semiconductor storage device, or any suitable combination of the foregoing. A computer readable storage medium 128, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be transmitted to respective computing/processing devices from the computer readable storage medium 128 or to an external computer or external storage device via the network 108. The network 108 can include private networks, public networks, wired networks, wireless networks, data networks, cellular networks, local area networks, wide area networks, the Internet, and combinations thereof. The network interface device 112 in each device receives computer readable program instructions from the network 108 and forwards the computer readable program instructions for storage in the computer readable storage medium 128 within the respective computing/processing device.

Computer readable program instructions for carrying out operations of the present invention may include assembler instructions, instruction-set-architecture (ISA) instructions, machine instructions, machine dependent instructions, microcode, firmware instructions, state-setting data, configuration data for integrated circuitry, compiled or interpreted instructions, source code or object code written in any combination of one or more programming languages or programming environments, such as Java® (Java is a registered trademark of Oracle America, Inc.), Javascript, C, C#, C++, Python, Cython, F#, PHP, HTML, Ruby, and the like.

The computer readable program instructions may execute entirely on the computer server 110, partly on the computer server 110, as a stand-alone software package, partly on the computer server 110 and partly on the local computing device 102 or entirely on the local computing device 102. For example, the local computing device 102 can include a web browser that executes HTML instructions transmitted from the computer server 110, and the computer server executes Java® instructions that construct the HTML instructions. In another example, the local computing device 102 includes a smartphone application, which includes computer readable program instructions to perform imaging and transfer of the payroll tax notice 104, and the computer server 110 includes different computer readable program instruction to receive and process the transferred payroll tax notice 104.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine ("a configured processor"), such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The memory 124 can include a variety of computer system readable media. Such media may be any available media that is accessible by computer server 110, and the media includes volatile media, non-volatile media, removable, non-removable media, and combinations thereof. Examples of the volatile media can include random access memory (RAM) and/or cache memory. Examples of non-volatile memory include magnetic disk storage, optical storage, solid state storage, and the like. As will be further depicted and described below, the memory 124 can include at least one program product having a set (e.g., at least one) of program modules 130 that are configured to carry out the functions of embodiments of the invention.

Figure 2:
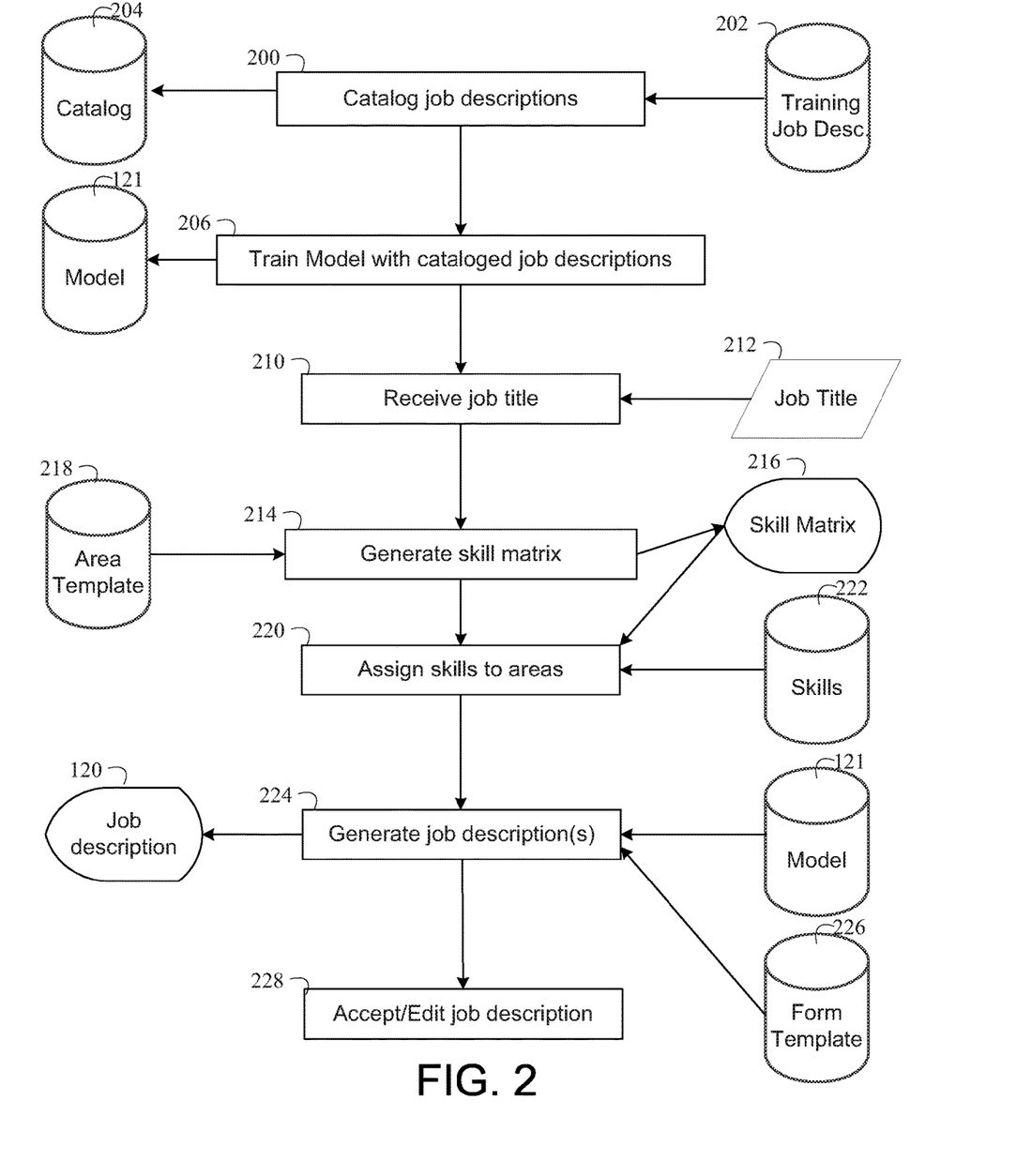
FIG. 2 is a flow chart illustration of an embodiment of the present invention.

FIG. 2 illustrates one embodiment of a method according to the present invention for generating a job description. At 200, a processor that is configured according to an aspect of the present invention (the "configured processor") catalogs job descriptions 202 into a catalog of job descriptions 204. The catalog of job descriptions 204 includes attributes of a job title, a hiring level, a hiring type, an industry type, experience and education, and combinations thereof. The catalog of job descriptions 204 can include the source of job descriptions 202 or can include pointers or links to the job descriptions 202. The catalog of job descriptions 204 can partition or separate the job descriptions according to one or more of the attributes.

The job title includes an alphanumeric character attribute that represents the position. In some embodiments, the job title includes an external title and an internal title. For example, the external title includes "Lead Information Technology Developer" and an internal title includes "IT Developer IV."

The hiring level includes an alphanumeric character attribute that represents the level of the position within the entity. For example, the hiring level can include a set of labels, such as "entry level," "middle level," "senior level," "manager level," "executive level," "senior executive level," etc. In some embodiments, the hiring level can include a numeric label, n, where n is an integer representing a reporting level within the entity, such as 0 for the President or Chief Executive Officer (CEO), 1 for a vice president reporting directly to the president, 2 for a manager reporting directly to the vice president, etc.

The hiring type includes an alphanumeric character attribute that represents a manner of recruitment in which the position is normally filled, such as, for example, "urgent," "campus," "walk-in", "recruiter," and "search committee."

The industry type includes an alphanumeric character attribute that represents a broad category of the business, social, or economic activity of the entity, such as, for example, "manufacturing," "medical," "educational," "legal," "financial," "engineering," etc. In some embodiments, the industry type represents a broad category of the business, social, or economic activity of a subset of the entity, such as a primary activity of the department in which the position participates, such as, for example, an engineering department, a financial department, etc. In some embodiments, the industry indicator can be based on industry classifications, such as North American Industry Classification System (NAICS), Industry Classification Benchmark (ICB), Standard International Trade Classification (sac), and the like. In some embodiments, values of the industry indicator are mapped from a plurality of industries to a single value of the industry indicator.

The experience and education attribute can include a composite attribute representing the years of relevant experience and educational degrees that are needed to qualify for the position. For example, a first attribute includes a numerical value representing the time of relevant experience, such as a number of years, and a second attribute includes a degree level, such as "GED," "Associate," "Bachelor," "Master," and "Doctorate." In some embodiments, the experience is based on work experience in a same type of industry. In some embodiments, the education includes specific degree requirements, such as "Master of Business Administration (M.B.A.)," "Doctor of Medicine (M.D.)" "Doctor of Jurisprudence (J.D.)," "Bachelor of Science (B.S.)," "Doctor of Philosophy in Chemistry (Ph.D.)," etc. The composite attribute can include a concatenation of the experience and education attributes.

At 206, the configured processor trains the linguistic model 121 on the job descriptions 202 according to the catalog of job descriptions 204. In some embodiments, the trained linguistic model 121 differentiates according to attributes of the catalog of job descriptions. That is, separate models are trained according to a subset of attributes. In some embodiments, the training includes classification of the attributes according to the catalog of job descriptions 204.

The linguistic model 121 includes natural language based neural network models, such as a character level recurrent neural network (char-RNN) deep learning model with long short term memory (LSTM), recurrent neural network, and the like. The linguistic model 121 generates sentences according to an input character sequence. That is, given a sequence of characters, such as, for example, a word or words representing a job skill, the trained linguistic model 121 can output a sentence with the skill. The trained linguistic model 121 includes character classification of word stems. For example, "programming in language X" and "writes programs in language X" are similarly classified for word stems of the word "program."

The LSTM adds a memory to individual units in the char-RNN model, which can provide semantic parsing and resolve the context of terms within sentences and across sentences, such as for example, the use of pronouns.

In some embodiments, the linguistic model 121 can output a plurality of sentences according to an input sequence of the job skill, which vary according to a probability measure. In some embodiments, the output sentence includes the probability measure. For example, for a job title of an artificial intelligence (AI) developer, and the input of the skill of "Python", the linguistic model 121 generates a first sentence "The AI developer creates linguistic models in Python," with a probability of 0.87, and a second sentence "The AI developer creates network models in Python and/or Cython," with a probability of 0.81.

The linguistic model 121 can classify sentences according to the cataloged attribute of industry type, which accommodates different writing styles of the different industry types. For example, a "Project Manager" job position with the skill of "effective listening" in the industry type of "higher education" can include the sentence "The project manager practices effective listening with faculty, staff and students," while for the industry type of "finance" the sentence can be written as "The project manager effectively listens to clients."

At 210, the configured processor receives a job title 212. The job title 212 can be received via direct input; selected from a list, such as, for example, from a list of employee titles within a department; or directly from another system, such as, for example, an employee requisition system.

At 214, in response to the receiving the job title 212, the configured processor generates and displays a skill matrix 216 based on the job title 212 and an area template 218. The skill matrix 216, as displayed, visually represents the skill requirements for the job position. The area template 218 for each job title 212 includes a set of predetermined areas and each area includes a relative weight. The weights and areas represented in the area template 218 vary according to the job title 212. The areas label aspects of job functions with types of skills. For example, an information technologist job can include areas with relative weights, such as design 10%, communication 10%, experience 30%, technical 50%. The information technologist can reasonably expect to spend approximately 10% of the time utilizing design skills. Likewise, the information technologist can reasonably expect to spend approximately 30% of the time utilizing recurrent skills, and 50% of the time utilizing technical skills. The areas can include design, communication, experience, technical, leadership, management, operations, database systems, web development, application development, team building, product management, strategy, sales, marketing, project management, program management, billing, quality control, quality assurance, modelling, etc. The labels of job areas, the number of job areas, and the weights can be adjusted with inputs from the input device 118.

At, 220, in response to inputs from the input device 118, the configured processor assigns skills 222 to each area of the displayed the skill matrix 216. The inputs, for example, can include a drag and drop operation from a selected displayed label of a skill dragged to within a displayed boundary of one area of the skill matrix 216.

The skills 222 can include hard job skills and soft job skills. Hard job skills include specific, teachable abilities that can be defined and measured, for example, proficiency in a spoken or written language, proficiency in a software product or system, operation of a specific device, practice of a specific process, and the like. The soft skills include interpersonal skills or people skills, such as, for example, leadership, teamwork, communication skills, listening skills, creative thinking, conflict resolution, time management, problem solving, and the like. Each skill is labeled and displayed separately. Skills can overlap over skills. For example, "computer programming" can overlap "Python". In some embodiments, the displayed skills 222 are predetermined according to at least one attribute of the catalog 204. The skills 222 can include a set of predetermined skills. The skills 222 can include new skills entered with inputs from the input device 118 concurrently with the displayed skill matrix 216.

At 224, the configured processor generates the job description 120 according to the job areas 218 and the linguistic model 121. Each job area 218 includes one or more assigned job skills. The linguistic model 121 can generate a plurality of job descriptions 120 by varying the combination of generated sentences according to the different probabilities. In some embodiments, the configured processor orders the plurality of job descriptions 120 according to an acceptance ratio of previously generated same job descriptions. In some embodiments, the acceptance ratio can include an acceptance ratio for a same entity, same department, an attribute of the catalog 204, and combinations thereof. The configured processor displays the generated job description 120 on the display device 116.

In some embodiments, the generated sentences are ordered by the job area 218. For example, sentences of job skills assigned to the job area 218 with a largest weight are ordered first, and sentences of job skills assigned to the job area 218 with a second largest weight are ordered second. In some embodiments, the order of sentences within the job area 218 are ordered according to the probability of the match or classification of the assigned skill.

The generated job description 120 can be further ordered, such as by paragraphs according to a form template 226. The form template can organize the paragraphs and include headings, such as job summary, duties, goals, qualifications and experience, and the like. The form template can include additional sentences specific to the entity and non-specific to the specific job description. For example, the form template 226 can include an opening sentence of a paragraph that briefly describes the entity or aspects of the entity.

Generating the job description 120 using the linguistic model 121 can reduce the steps over conventional practice of iterative development between multiple departments. For example, review of past job description data, review and incorporation of similar profiles on boards, and mapping to specific industry requirements can be eliminated. The linguistic model 121 inherently adapts to writing styles of different industries based on attributes from the catalog 204 used to train the linguistic model 121. Revisions, such as keyword review and replacement, can be eliminated. Moreover, the linguistic model 121 can provide industry-based experience for small entities that infrequency generate job descriptions. The linguistic model 121 can provide timely job description over conventional practice of the iterative development, which shortens a duration of time from approval of a new position to a posting of a job description.

At 228, the configured processor can accept or edit the generated job description(s) 120. In some embodiments, an input from the input device 118 accepts the job description 120. In some embodiments, another input selects one job description from the plurality of job descriptions 120.

Figure 3:
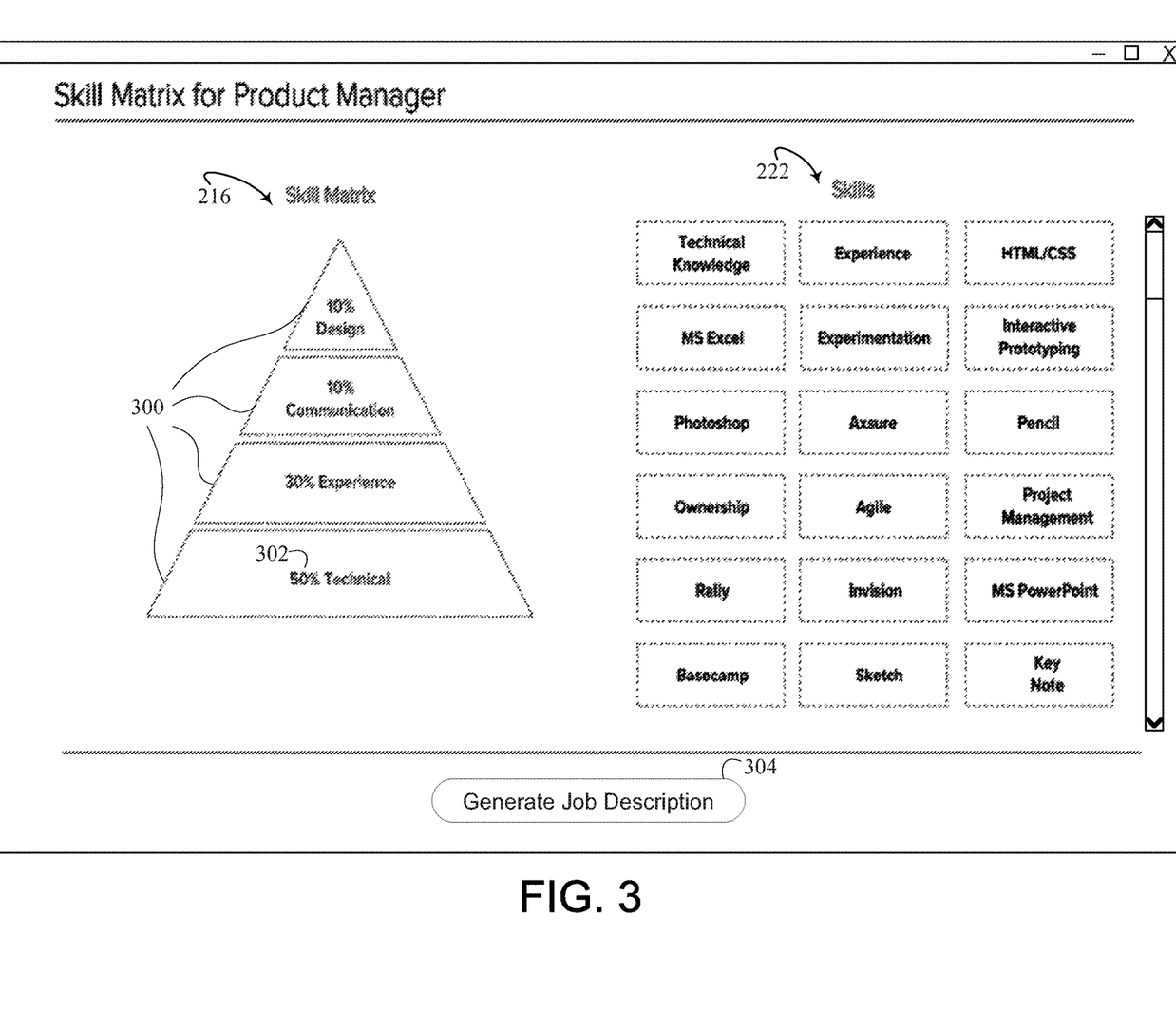
FIG. 3 depicts an example user interface according to an embodiment of the present invention.

FIG. 3 depicts an example user interface according to an embodiment of the present invention, which displays the skill matrix 216 and the skills 222. The skill matrix 216 is represented as a segmented pyramid with a one to one correspondence between each segment and a labeled job area 300. Each labeled job area can include a relative weight 302. The segments can be ordered in size to correspond to the relative weights 302. For example, the largest segment is labeled "Technical" and includes the largest relative weight 302 of 50%. The relative weights 302 can be adjusted by inputs from the input device 118.

The skill matrix 216 can be represented with other polygons or shapes, such as a circle. For example, a pie chart with slices sized according to relative weights, a bar chart with bars sized according to relative weights, etc. Additional job areas can be added by input.

The skills 222 can be selected and assigned to corresponding job areas 300 of the skill matrix using inputs, such as use of a drag and drop operation, a pop-up box, a right mouse click and selection, voice commands, keyboard commands, and the like.

As the skills 222 are assigned, the assigned skills can be shown relative to the corresponding job area 300, such as within a segment boundary or adjacent to the segment boundary. One skill can be assigned to one or more of the job areas 300. Additional skills can be added to the skills 222.

The user interface includes a button 304, such as labeled "generate job description", other indicator, or command, which, as input to the configured processor, generates the job description 120.

Figure 4:
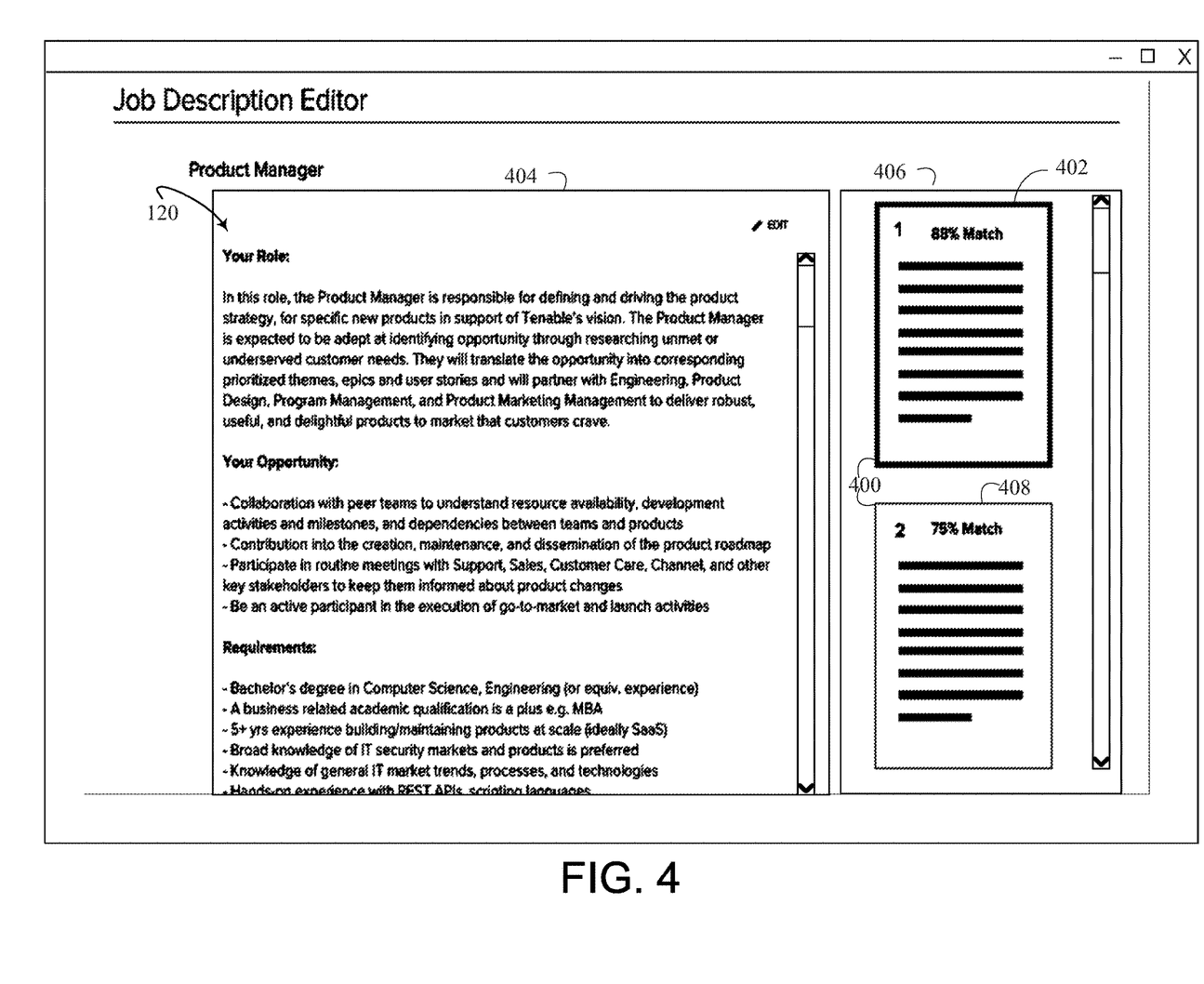
FIG. 4 depicts another example user interface according to an embodiment of the present invention.

FIG. 4 depicts another example user interface according to an embodiment of the present invention, which displays the job description 120 and a plurality of job descriptions 400. A highest ranked job description 402 is presented in a first viewing area 404 as a default job description. The plurality of job descriptions 406 can be displayed in miniature or as icons in a second viewing area 408. Selection of a second job description 408, such as with an input, for example, of a mouse click, displays the selected job description in the first viewing area 404.

The ranking of the plurality of job descriptions 400 can be according to the combined probabilities of sentences from the linguistic model 121 or according to the acceptance ratio of previously generated same job descriptions, such as from a same entity, same department, an attribute of the catalog 204, and combinations thereof. The same job descriptions can include the same job title or similar job titles, such as, for example, "developer" and "senior developer" or other variations according to the attributes of the catalog 204.

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification specify the presence of stated features, integers, steps, operations, elements, and/or components, but do not preclude the presence or addition of one or more other features, integers, steps, operations, elements, components, and/or groups thereof. Certain examples and elements described in the present specification, including in the claims, and as illustrated in the figures, may be distinguished, or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations, or process steps.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising executing on a computer processor:
   driving a display device to display to a user a graphical user interface that comprises a button; in response to a selection of the button via a graphical user interface input and an input of job skill text data, generating a plurality of job skill description sentences as a function of a neural network linguistic model that is trained on a plurality of cataloged job descriptions that comprise the job skill text data, wherein the job skill description sentences comprise different pluralities of words that are generated to match a writing style of an industry type of the job skill text data input;
   training the neural network linguistic model to comprise a character level recurrent neural network (char-RNN) deep learning model with long short term memory (LSTM) that generates the plurality of job description sentences based on assigned ones of the job skills and a training corpus of the plurality of cataloged job descriptions; and
   displaying the generated plurality of job description sentences as selectable icons within the graphical user interface displayed on a the display device and rank ordered as a function of probability of match to the job skill text data input and as a function of acceptance ratios of each of the job skill description sentences for an attribute value of the plurality of cataloged job descriptions that is selected from an entity value and a department value.

2. The method of claim 1, further comprising:
   in response to receiving a job title, generating a skill matrix that includes the plurality of job areas, each job area identified by a label and assigned a relative weight;
   displaying the generated skill matrix and a set of skills within the graphical user interface displayed on the display device;
   assigning one or more of the set of skills to each job area; and
   determining the probability of match as a function of matching the assigned skills.

3. The method of claim 1, further comprising:
   cataloging a plurality of job descriptions according to a catalog attribute selected from a group consisting of job title, hiring level, hiring type, industry type, and experience and education; and
   rank ordering the selectable icons within the graphical user interface displayed on the display device and as a function of matching the catalog attribute.

4. The method of claim 1, further comprising:
   generating at least one of the plurality of job skill description sentences to match a writing style according to an industry type.

5. The method of claim 1, further comprising:
   in response to a graphical user interface input selection of one of the displayed selectable icons, displaying text content of a one of the plurality of job description sentences of the selected icon one job description in a viewing area of the graphical user interface displayed on the display device.

6. A system, comprising:
   a processor;
   a computer readable memory in circuit communication with the processor; and
   a computer readable storage medium in circuit communication with the processor;
   wherein the processor executes program instructions stored on the computer-readable storage medium via the computer readable memory and thereby:
   drives a display device in circuit communication with the processor to display to a user a graphical user interface that comprises a button;
   in response to a selection of the button via a graphical user interface input and an input of job skill text data, generates a plurality of job skill description sentences as a function of a neural network linguistic model that is trained on a plurality of cataloged job descriptions that comprise the job skill text data, wherein the job skill description sentences comprise different pluralities of words that are generated to match a writing style of an industry type of the job skill text data input;
   trains the neural network linguistic model to corn rise a character level recurrent neural network (char-RNN) deep learning model with long short term memory (LSTM) that generates the plurality of job description sentences based on assigned ones of the job skills and a training corpus of the plurality of cataloged job descriptions; and
   displays the generated plurality of job description sentences as selectable icons within the graphical user interface displayed on the display device and rank ordered as a function of probability of match to the job skill text data input and as a function of acceptance ratios of each of the job skill description sentences for an attribute value of the plurality of cataloged job descriptions that is selected from an entity value and a department value.

7. The system of claim 6, wherein the processor executes program instructions stored on the computer-readable storage medium via the computer readable memory and thereby:
   in response to receiving a job title, generates a skill matrix that includes the plurality of job areas, each job area identified by a label and assigned a relative weight;
   displays the generated skill matrix and a set of skills within the graphical user interface displayed on the display device;
   assigns one or more of the set of skills to each job area; and
   determines the probability of match as a function of matching the assigned skills.

8. The system of claim 6, wherein the processor executes program instructions stored on the computer-readable storage medium via the computer readable memory and thereby:
   generates at least one of the plurality of job skill description sentences to match a writing style according to an industry type.

9. The system of claim 8, wherein the processor executes program instructions stored on the computer-readable storage medium via the computer readable memory and thereby:

in response to a graphical user interface input selection of one of the displayed selectable icons, displays text content of a one of the plurality of job description sentences of the selected icon one job description in a viewing area of the graphical user interface displayed on the display device.

10. A computer program product, comprising:

a computer readable storage medium having computer readable program code embodied therewith, wherein the computer readable storage medium is not a transitory signal per se, the computer readable program code comprising instructions for execution by a processor that causes the processor to:

drive a display device in circuit communication with the processor to display to a user a graphical user interface that comprises a button;

in response to a selection of the button via a graphical user interface input and an input of job skill text data, generate a plurality of job skill description sentences as a function of a neural network linguistic model that is trained on a plurality of cataloged job descriptions that comprise the job skill text data, wherein the job skill description sentences comprise different pluralities of words that are generated to match a writing style of an industry type of the job skill text data input;

train the neural network linguistic model to comprise a character level recurrent that generates the plurality of job description sentences based on assigned ones of the job skills and a training corpus of the plurality of cataloged job descriptions; and display the generated plurality of job description sentences as selectable icons within the graphical user interface displayed on the display device and rank ordered as a function of probability of match to the job skill text data input and as a function of acceptance ratios of each of the job skill description sentences for an attribute value of the plurality of cataloged job descriptions that is selected from an entity value and a department value.

11. The computer program product of claim 10, wherein the instructions for execution cause the processor to:

in response to receiving a job title, generate a skill matrix that includes the plurality of job areas, each job area identified by a label and assigned a relative weight;

display the generated skill matrix and a set of skills within the graphical user interface displayed on the display device;

assign one or more of the set of skills to each job area; and determine the probability of match as a function of matching the assigned skills.

12. The computer program product of claim 10, wherein the instructions for execution cause the processor to:

catalog a plurality of job descriptions according to a catalog attribute selected from a group consisting of job title, hiring level, hiring type, industry type, and experience and education; and rank order the selectable icons within the graphical user interface displayed on the display device and as a function of matching the catalog attribute.

13. The computer program product of claim 10, wherein the instructions for execution cause the processor to:

generate at least one of the plurality of job skill description sentences to match a writing style according to an industry type.

14. The computer program product of claim 10, wherein the instructions for execution cause the processor to:

in response to a graphical user interface input selection of one of the displayed selectable icons, display text content of a one of the plurality of job description sentences of the selected icon one job description in a viewing area of the graphical user interface displayed on the display device.

\* \* \* \* \*